US010153915B2

(12) United States Patent
Doberstein et al.

(10) Patent No.: US 10,153,915 B2
(45) Date of Patent: Dec. 11, 2018

(54) REFRIGERATION UNIT MONITORING, CONTROL AND FEEDBACK SYSTEM

(71) Applicant: U-Line Corporation, Milwaukee, WI (US)

(72) Inventors: Andrew J. Doberstein, Slinger, WI (US); Richard A. Abegglen, Fredonia, WI (US); Michael D. Gilioli, Milwaukee, WI (US); Matthew K. Wenninger, Oak Creek, WI (US)

(73) Assignee: U-Line Corporation, Milwaukee, WI (US)

( * ) Notice: Subject to any disclaimer, the term of this patent is extended or adjusted under 35 U.S.C. 154(b) by 0 days.

(21) Appl. No.: 15/612,122

(22) Filed: Jun. 2, 2017

(65) Prior Publication Data

US 2017/0353327 A1 Dec. 7, 2017

Related U.S. Application Data

(60) Provisional application No. 62/344,530, filed on Jun. 2, 2016.

(51) Int. Cl.
*H04L 12/28* (2006.01)
*F25D 29/00* (2006.01)
*H04L 29/08* (2006.01)

(52) U.S. Cl.
CPC .......... *H04L 12/2818* (2013.01); *F25D 29/00* (2013.01); *H04L 12/2825* (2013.01); *H04L 67/26* (2013.01); *F25B 2600/07* (2013.01); *F25D 2400/361* (2013.01); *F25D 2600/04* (2013.01); *F25D 2600/06* (2013.01); *F25D 2700/02* (2013.01); *F25D 2700/08* (2013.01);
(Continued)

(58) Field of Classification Search
CPC . H04L 12/2818; H04L 67/26; H04L 12/2825; H04L 2012/2841; H04L 2012/285; F25D 29/00; F25D 2600/06; F25D 2700/12; F25D 2600/04; F25D 2400/361; F25D 2700/02

See application file for complete search history.

(56) References Cited

U.S. PATENT DOCUMENTS

| 2013/0229172 A1* | 9/2013 | Heo | F25D 29/00 324/157 |
| 2014/0216071 A1* | 8/2014 | Broadbent | H04L 67/125 62/66 |
| 2015/0000316 A1* | 1/2015 | Sato | F25D 23/00 62/127 |

FOREIGN PATENT DOCUMENTS

GB 2 507 929 A 5/2014

OTHER PUBLICATIONS

International Search Report and Written Opinion for PCT/US2017/035643, dated Aug. 3, 2017, 15 pp.

* cited by examiner

*Primary Examiner* — Erin F Heard
(74) *Attorney, Agent, or Firm* — Brinks Gilson & Lione

(57) ABSTRACT

A monitoring, control and feedback system for a refrigeration unit is provided that includes a wireless transceiver operably connected to the control circuitry of a refrigeration unit. The transceiver is operably connected to the central processing unit (CPU) of the refrigeration unit and receives signals from the CPU regarding the operation of the refrigeration unit. The transceiver wireless communicates these signals to a program or application stored and operating on a suitable user device that displays the signals illustrating the current operational parameters of the refrigeration unit on the user device while also enabling the user to control the operation of refrigeration unit remotely.

20 Claims, 20 Drawing Sheets

(52) U.S. Cl.
CPC .... *F25D 2700/12* (2013.01); *H04L 2012/285* (2013.01); *H04L 2012/2841* (2013.01)

FIG. 2A

ENTRANCE SCREEN

MANUFACTURER

TRY DEMO MODE

REGISTER | SIGN IN

FIG. 2B

SIGN IN

MANUFACTURER

EMAIL

PASSWORD

SIGN IN    REGISTER

FORGOT PASSWORD?

KEYBOARD

FIG. 2C

REGISTER

MANUFACTURER

EMAIL

PASSWORD

BY CLICKING REGISTER, YOU AGREE TO USER AGREEMENT AND PRIVACY POLICY.

REGISTER

KEYBOARD

FIG. 4C

HELP & SUPPORT

≡ HELP & SUPPORT

THANK YOU, YOUR REQUEST HAS BEEN SENT. YOU WILL RECEIVE A CALL BACK AS SOON AS POSSIBLE.

FIG. 4B

HELP & SUPPORT

≡ HELP & SUPPORT

WEBSITE ADDRESS
TELEPHONE NUMBER
EMAIL ADDRESS

SEND SUPPORT REQUEST TO CUSTOMER SERVICE

INCLUDE ANONYMOUS DIAGNOSTICS ☑

EMAIL ADDRESS
CONTACT ME VIA EMAIL

TELEPHONE NUMBER
CONTACT ME VIA PHONE

[SUBMIT]

FIG. 4A

USER APP SETTINGS

× USER SETTINGS        SAVE

ACCOUNT EMAIL ADDRESS

CHANGE PASSWORD
ENTER A NEW ACCOUNT PASSWORD

☑ MARKETING OPT-IN
  USER SELECTION

ANDROID

FIG. 8A

× PREFERENCES  SAVE

PRODUCT NAME

LOCATION
NONE
  ✓NONE
  HOME
  KITCHEN
  BAR
  EDIT LOCATIONS...

UNITS
FAHRENHEIT

LANGUAGE
ENGLISH

FIG. 8B

× PREFERENCES  SAVE

PRODUCT NAME

LOCATION
NONE

UNITS
FAHRENHEIT
  ✓FAHRENHEIT
  CELSIUS

LANGUAGE
ENGLISH

FIG. 8C

× PREFERENCES  SAVE

PRODUCT NAME

LOCATION
NONE

UNITS
FAHRENHEIT

LANGUAGE
ENGLISH
  ✓ENGLISH
  SPANISH
  GERMAN
  FRENCH
  ITALIAN
  RUSSIAN
  CHINESE

REFRIGERATION UNIT MONITORING, CONTROL AND FEEDBACK SYSTEM

RELATED APPLICATIONS

This application claims priority from U.S. Provisional Application No. 62/344,530, filed on Jun. 2, 2016, the entirety of which is hereby fully incorporated by reference herein.

1. Technical Field

The present invention relates generally to refrigeration units, and more specifically to systems for controlling the refrigeration units.

2. Background Information

In order to properly operate refrigeration units, there are different operational parameters that can be set in order to configure the refrigeration unit to perform optimally. However due to many considerations, including but not limited to the types and number of items stored in the unit, the number of times the unit is opened and closed, whether the unit has separate compartments for storing items at different temperatures, etc.

With regard to all of the parameters it can be difficult to monitor all of the various parameters to maintain the unit operating properly with regard to the particular considerations for the unit, especially when the operator is required to visually inspect the unit with regard to these parameters.

In addition, with regard to any faults or malfunctions in the unit, or any maintenance that needs to be performed on the unit, these also require a visual and/or manual inspection of the unit.

Thus, it is desirable to develop a system and method for providing information on the operating characteristics of a refrigeration unit that does not require the visual and/or manual inspection of the unit.

BRIEF SUMMARY

Briefly described, according to an exemplary embodiment of the invention a monitoring, control and feedback system for a refrigeration unit includes a wireless transceiver operably connected to the control circuitry of a refrigeration unit. The transceiver is operably connected to the central processing unit (CPU) of the refrigeration unit and receives signals from the CPU regarding the operation of the refrigeration unit. The transceiver wirelessly communicates these signals to a program or application stored and operating on a suitable user device that displays the signals illustrating the current operational parameters of the refrigeration unit on the user device. In this manner the system enables the user to view the operational parameters remotely from the refrigeration unit. According to another exemplary embodiment of the invention, the system enables the transceiver to receive signals from the user device that are transmitted to the CPU to control the operation of the refrigeration unit.

According to still another exemplary embodiment of the invention, the system can also enable signals from the CPU regarding maintenance or operation errors for the refrigeration unit to be transmitted to the user device.

Numerous other aspects, features, and advantages of the invention will be made apparent from the following detailed description together with the drawings figures.

BRIEF DESCRIPTION OF THE DRAWINGS

The drawings illustrate the best mode currently contemplated of practicing the present invention. In the drawings:

FIGS. 2A-2C are screen shots of a registration/sign up mode of the application/system according to an exemplary embodiment of the invention.

FIGS. 4A-4E are screen shots of a system support mode of the application/system according to an exemplary embodiment of the invention.

FIGS. 8A-8C are screen shots of a notification preference mode of the application/system according to an exemplary embodiment of the invention.

FIGS. 10A-0D are screen shots of a registration/sign up mode of the application/system according to an exemplary embodiment of the invention.

DETAILED DESCRIPTION OF THE DRAWINGS AND THE PRESENTLY PREFERRED EMBODIMENTS

Reference will now be made in detail to various embodiments of the invention one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further em bodiment. Thus, it is intended that the present invention covers such modifications and variations as come within the scope of the appended claims and their equivalents.

Figure 1:
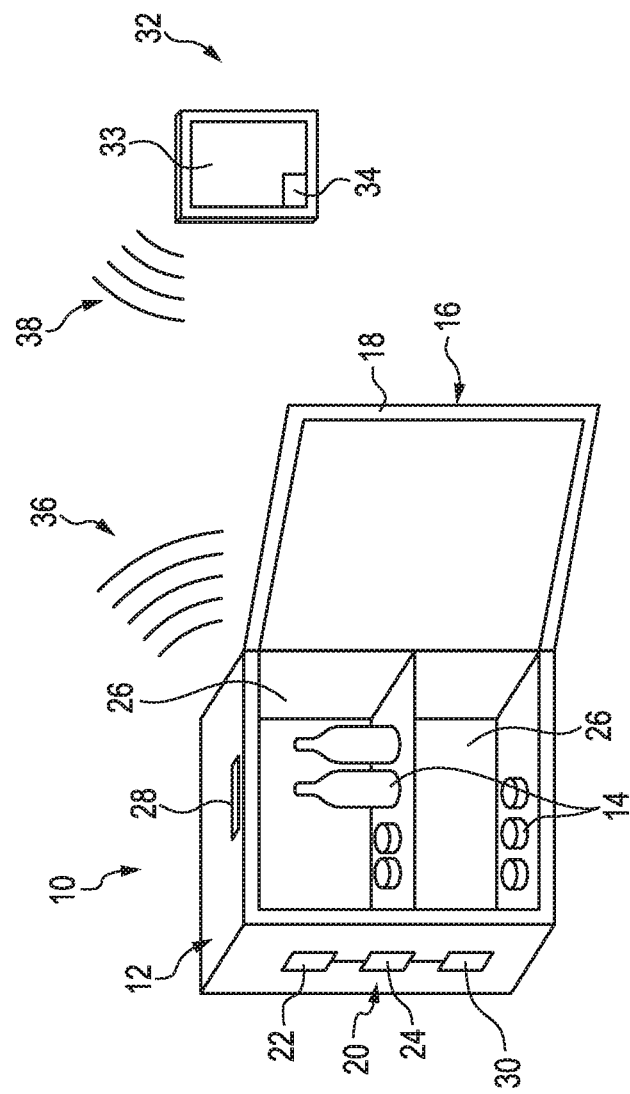
FIG. 1 is an isometric view of a refrigeration unit compatible with the monitoring, control and feedback system according to an exemplary embodiment of the invention.

Referring now to FIG. 1, a refrigeration unit 10 is illustrated in accordance with one exemplary embodiment of the invention. The unit 10 includes a housing 12 within which a number of food products 14 of various types are to be stored, and a closure 16, such as a door 18, connected to the housing 12 and selectively operable to access the food products 14 disposed within the housing 12.

The unit 10 additionally includes a control system 20 disposed within the housing 12. The control system 20 includes a central processing unit (CPU) 22 that is connected to a cooling system 24 disposed within the housing 12 and operable via a suitable power source (not shown) to cool one or more compartments 26 within the interior of the housing 12 and to a display 28 disposed on the exterior of the housing 12. The display 28 provides a visual indication of the operating conditions/parameters of the unit 10 that can be viewed by an individual.

The control system 20 additionally includes a wireless transceiver 30 operably connected to the CPU 22. The transceiver 30 is configured to send and receive wireless signals to and from a user device 32 that is remote from the unit 10. The user device 32 includes a suitable interactive screen 33 or other suitable user input system, and can be any suitable wireless device as is known in the art, such as a mobile phone, tablet computer, or other similar device, among others. The user device 32 includes a program or application 34 stored thereon that enables signals 36 from the transceiver 30 to be received by the device 32 and signals 38 from the device 32 to be received by the transceiver 30.

The signals 36 sent form the transceiver 30 to the device 32 include information on the status of the operation of the unit 10 as received by the transceiver 30 from the CPU 22, among other information. The signals 38 sent by the device 32 include control information regarding alterations in the operation of one or more aspects of the unit 10 among other information. The signals 36 and 38 may be transmitted according to any known transmission or networking protocol such as Bluetooth, Wi-Fi, WLAN, cellular (4G, LTE/A). The signals may alternatively be transmitted via wired networks, such as Ethernet, Gigabit Ethernet, optical networking protocols, and/or other networks and network protocols.

Referring now to FIGS. 2A-2C, an exemplary embodiment is shown of the manner in which the system 20 provides information on the screen 33 of the device 32 relating to a registration of the user with the system 20 for easy access to the system 20. As depicted in FIG. 2B, the user may establish an account with the manufacturer to allow for the operation of the system 20 through the device 32.

Figure 3B:
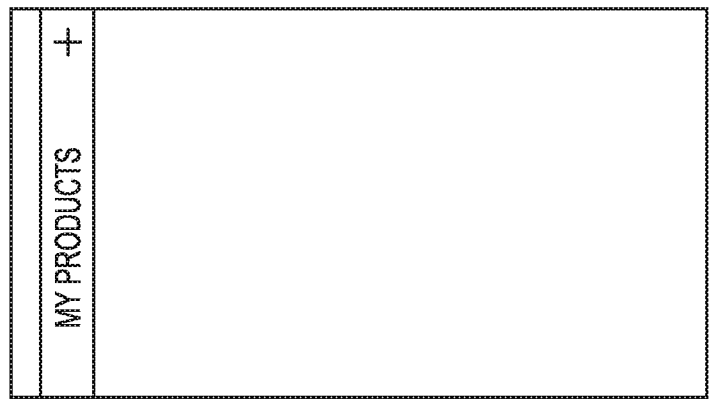
FIGS. 3A-3F are screen shots of a product registration mode of the application/system according to an exemplary embodiment of the invention.
Figure 3A:
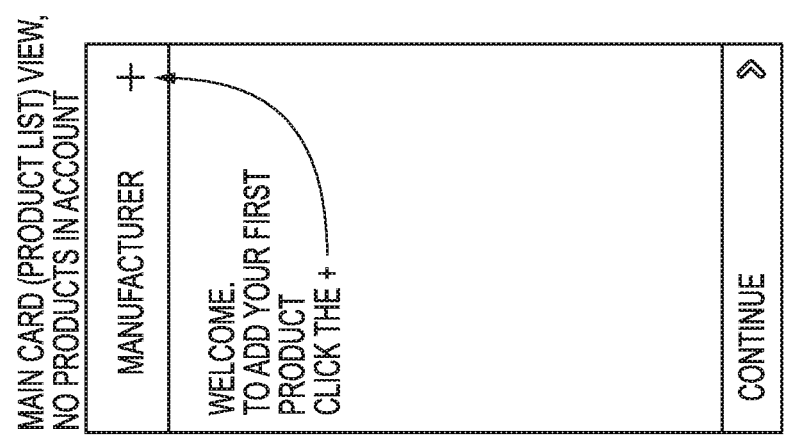
Figure 3D:
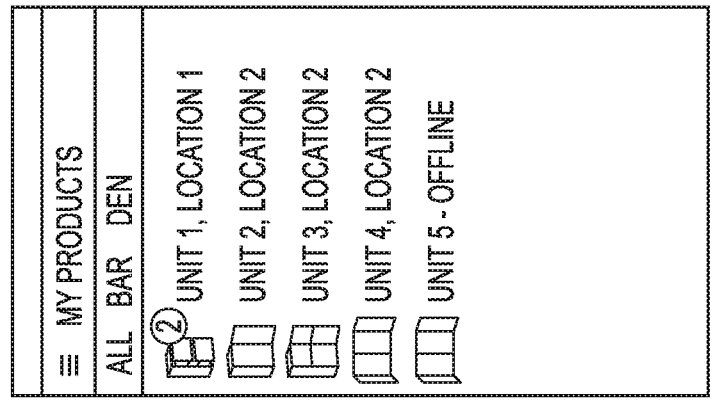
Figure 3C:
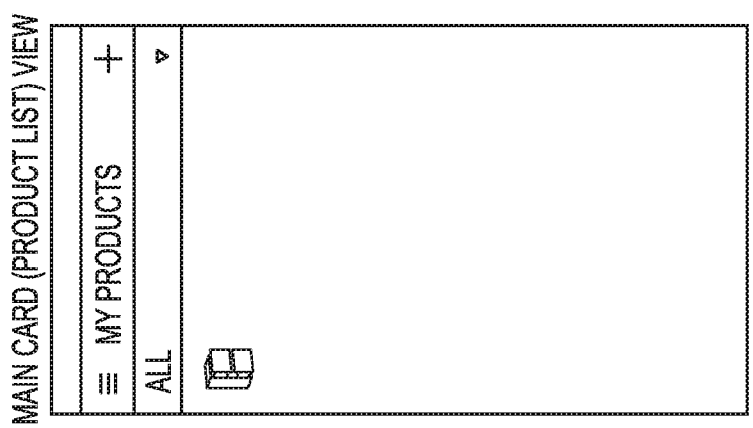
Figure 3F:
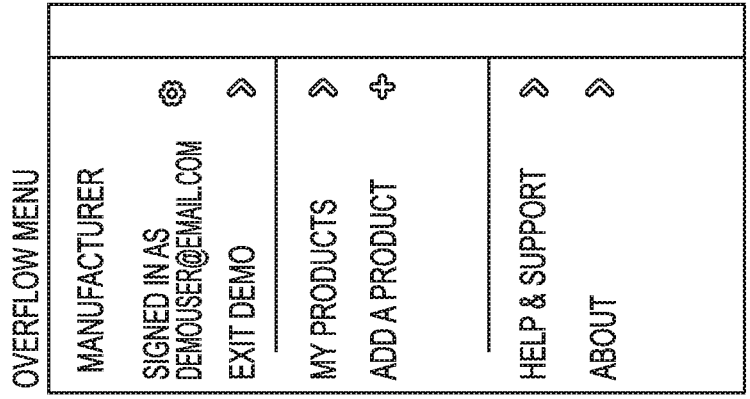
Figure 3E:
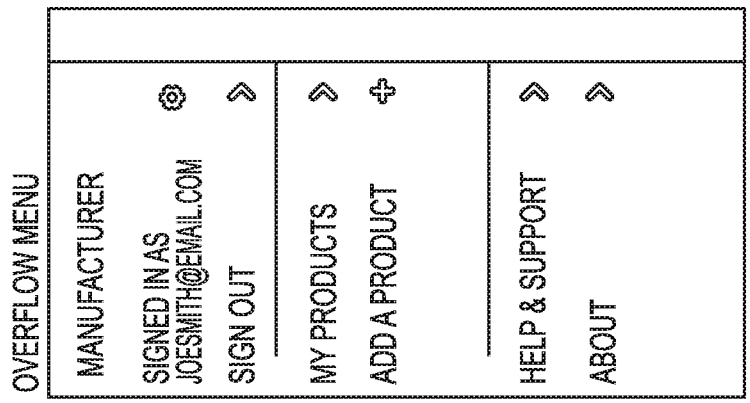

Referring now to FIGS. 3A-3F, an exemplary embodiment is shown of the manner in which the system 20 provides information on the screen 33 of the device 32 relating to the registration of the unit 10 or multiple units 10 with the system 20 in order for the system 20 to provide information about the unit(s) 10 to and from the device 32 via the system 20. For example, in embodiments where multiple units 10 are monitored by the same device 32, the device may store and reference the name of the each specific unit as well as the location of the unit. By way of example, the user may be prompted to click a buttom/symbol/link that displays on a screen, which will open a new screen for entry of information or display of pertinent questions or prompt, as understood with reference to FIGS. 3A and 3B, i.e. when the "+" symbol on FIG. 3A is clicked by the user the screen depicted in FIG. 3B is depicted to the user. Other figures depicted in the figures associated with this specification operate in this same manner as will be understood with reference to the figures. By way of example, clicking the "Submit" button depicted in FIG. 4B calls forth the display of FIG. 4C that provides a visual acknowledgement to the user, which is schematically shown with the arrow between FIGS. 4B and 4C. Other cause/effect relationships for displays and prompts to the user can be provided to the user for other functionality and information to be provided to the user and one of ordinary skill in the art will understand how this can be implemented further with the various displays provided in this application without undue experimentation.

Figure 4E:
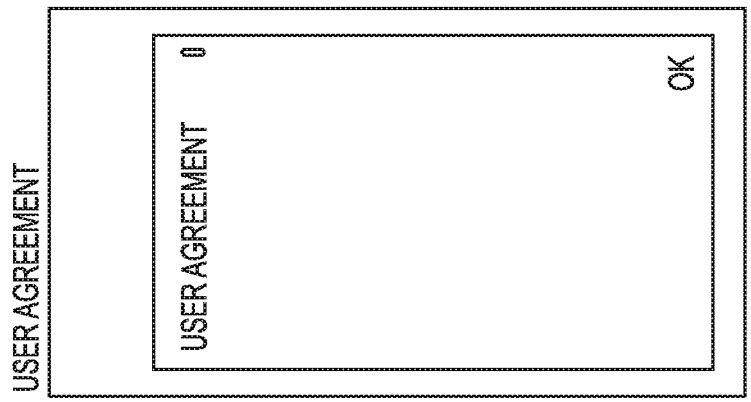

Referring now to FIGS. 4A-4E, an exemplary embodiment is shown of the manner in which the system 20 provides information on the screen 33 of the device 32 relating to a help and support function for the system 20 to provide the user with the detail regarding the operation of the system 20. As depicted in FIG. 4B, in some embodiments, application may be configured to allow the user to directly communicate with the manufacturer (or a third party that is designated to communicate with the user) regarding the operation of the unit, regarding the registration of the unit, regarding a request for help or support regarding the operation of the unit or the application. The system 20 may provide an indication to the user that a request for communication was successful received, as depicted in FIG. 4C. The communication may be through email, telephone or a website communication structure or the like. As depicted in FIG. 4A, the system may be configured to automatically provide the user to accept the receipt of marketing materials or other communications from the manufacturer or other related entities. The system may be defaulted such that the user automatically accepts these communications, and in some embodiments, the user may take action (such as unchecking a box) to opt out of receipt of communications from the manufacturer.

Figure 4D:
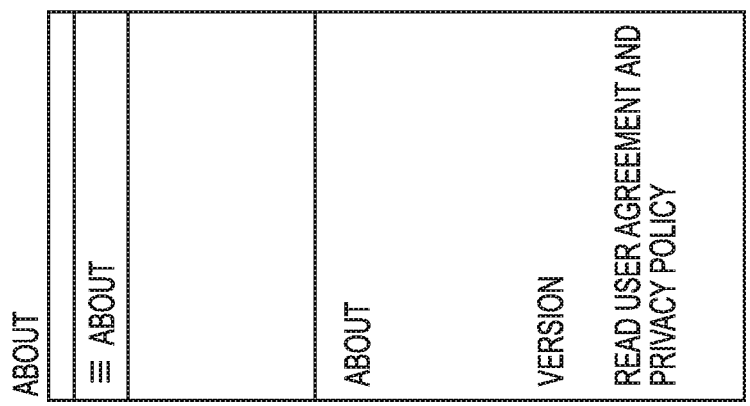

As depicted in FIGS. 4D and 4E, the system may be configured to provide the user with information about the application 34 as well as the unit 10 being controlled. The system may provide the user with a User Agreement, which may include appropriate terms and conditions established by the manufacturer or the manufacturer's designee regarding the operation of the application 34 as well as the unit 10. In some embodiments, the application may require that the user agree with the terms and conditions, such as by clicking "OK" or another suitable method before the user can further use the application 34 or the unit.

Figure 5B:
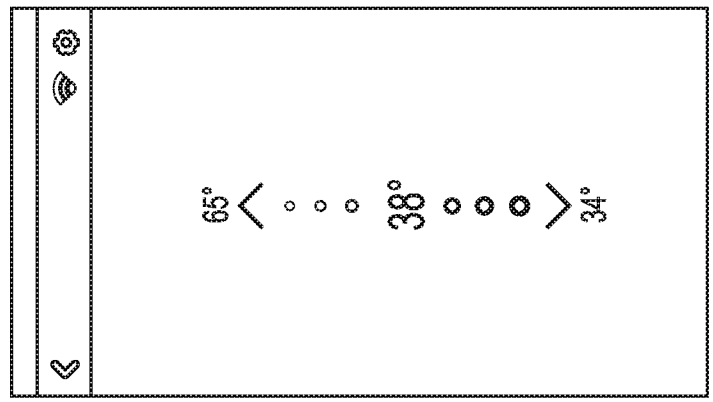
FIGS. 5A-5E are screen shots of a control mode of the application/system according to an exemplary embodiment of the invention.
Figure 5A:
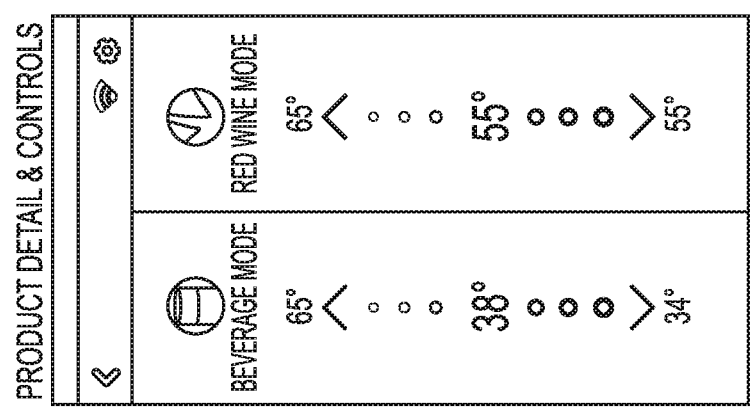
Figure 5E:
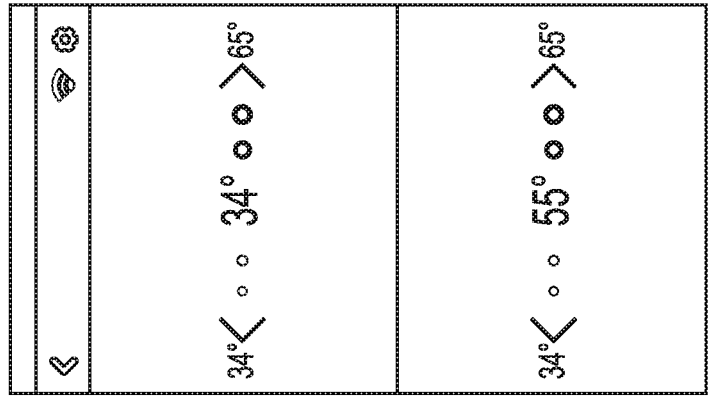
Figure 5D:
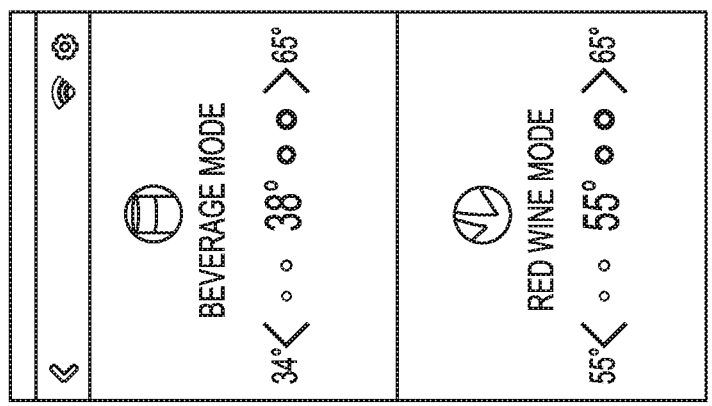
Figure 5C:
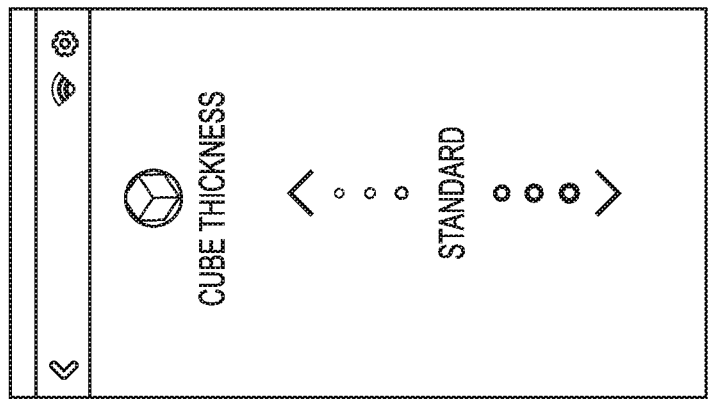

Referring now to FIGS. 5A-5E, an exemplary embodiment is shown of the manner in which the system 20 provides information on the screen 33 of the device 32 relating to the various control settings for the unit(s) 10 that can be altered via the device 32 via the system 20. For example, the system may allow various parameters of the unit to be adjusted through the user interacting with the application through the device, such as temperature of the unit, a different mode of operation of the unit, and the like. The adjustment may be by entering desired setpoints, such as a desired temperature, or increasing or lowering a temperature within an established range, or changing a control band of the parameter. In other examples, the system may be configured to control multiple different parameters of operation of the unit, such as temperature, mode of operation (e.g. "Beverage Mode," (with a temperature range associated with beverages or food maintained only slightly above freezing (e.g. with a low threshold at 34 degrees Fahrenheit) "Red Wine Mode" (FIG. 5D) (with a higher temperature range normally associated red wine (e.g. between 55 degrees and 65 degrees Fahrenheit), to an ice cube thickness mode which allows the user to select the nominal size of the ice cubes produced by the unit (FIG. 5C). In some embodiments as depicted in FIG. 5A, the unit may include multiple compartments (side by side on the display as arranged in the unit) that can be controlled differently, such as with different modes of operation, and allow for the user to select a different setpoint within each different compartment (numerically or visually within a range, such as smaller symbols and/or lighter (bluer) colors to graphically indicate a lower setpoint, and larger symbols and/or darker (redder) colors to graphically indicate a higher setpoint. Similarly, FIGS. 5D and E depict two compartments that be independently controlled above and below each other as depicted on the display (as arranged in the unit)

Figure 6C:
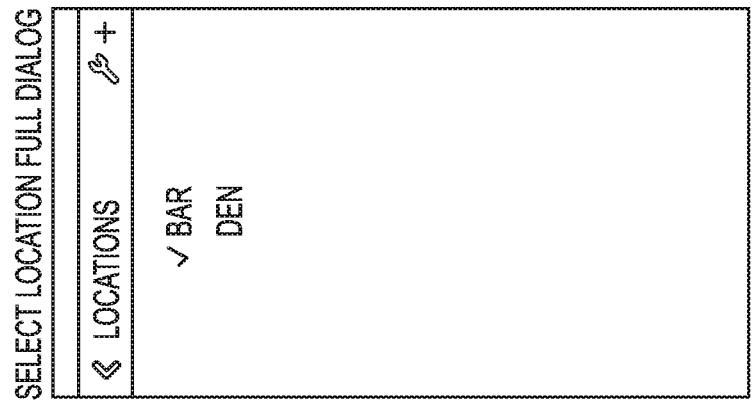
FIGS. 6A-6E are screen shots of a control preference mode of the application/system according to an exemplary embodiment of the invention.
Figure 6B:
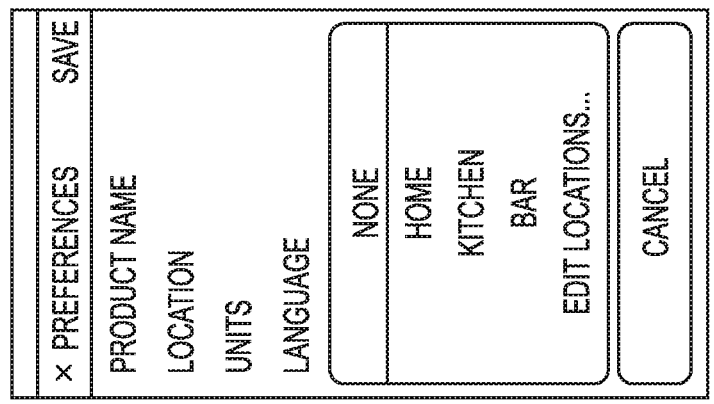
Figure 6A:
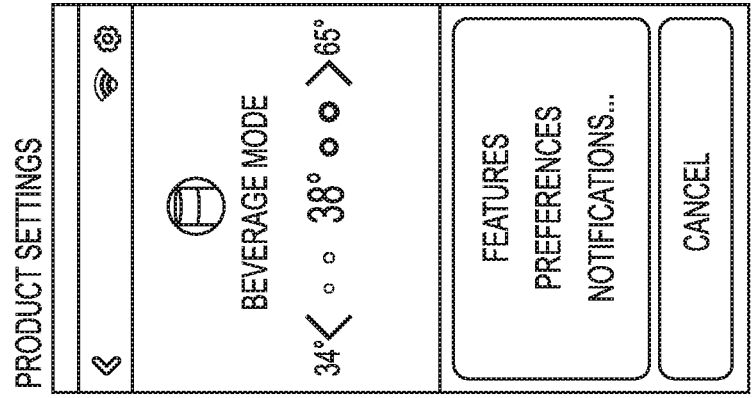
Figure 6E:
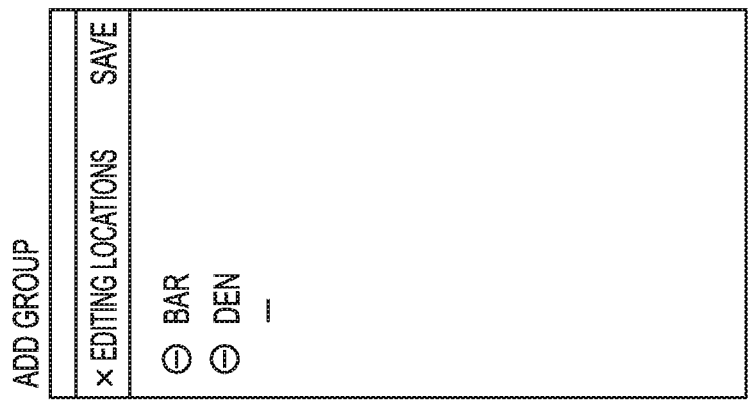
Figure 6D:
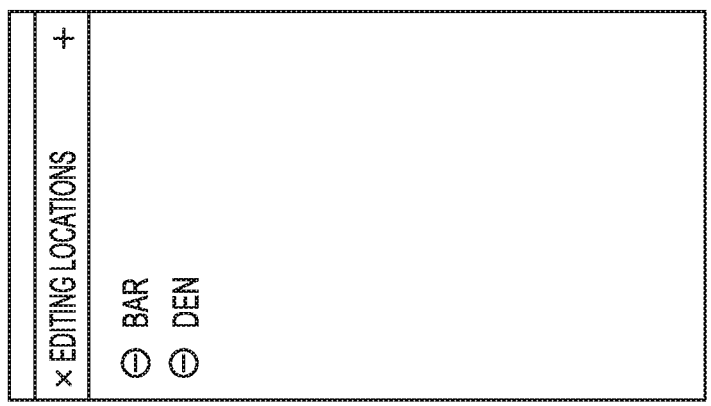

Referring now to FIGS. 6A-6E, an exemplary embodiment is shown of the manner in which the system 20 provides information on the screen 33 of the device 32 relating to control preference mode for altering the control settings for the unit(s) 10 via the system 20. AS depicted schematically in FIGS. 6B and 6C, when the user calls forth the "Edit Locations" functionality of the program 20, a new depiction on the device is provided to provide various "Locations" that can be chosen by the user (FIG. 6C), as well as prompt (e.g. the "+" depicted in FIG. 6C) that allow the user to enter the names of different potential locations. FIG. 6B depicts that the system may include various pre-programmed locations (e.g. "Home," "Kitchen," "Bar") and the user may enter additional locations by selecting the "Edit Locations . . . " prompt. This selectability feature depicted in FIGS. 6A-6C and discussed herein can be implemented in other portions of the software, such as providing for the user to program modes as depicted in FIGS. 9A-9D and discussed below.

Referring now to FIGS. 7A-7E, an exemplary embodiment is shown of the manner in which the system 20 provides information on the screen 33 of the device 32 relating to the features of the system 20 that can be utilized in determining how and what settings of the unit(s) 10 can be modified/controlled by the system 20.

Figure 7A:
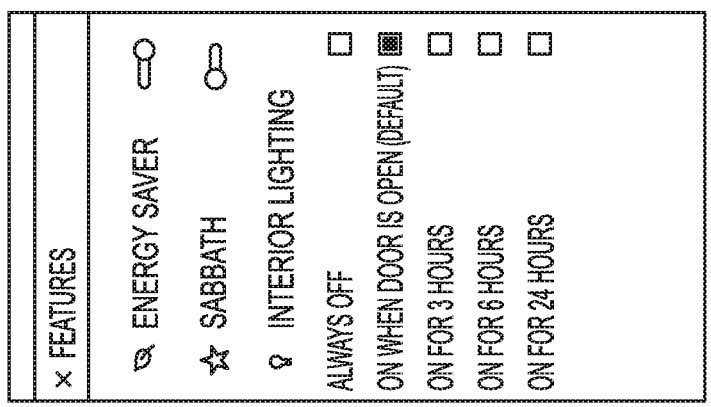
FIGS. 7A-7E are screen shots of a features mode of the application/system according to an exemplary embodiment of the invention.
Figure 7B:
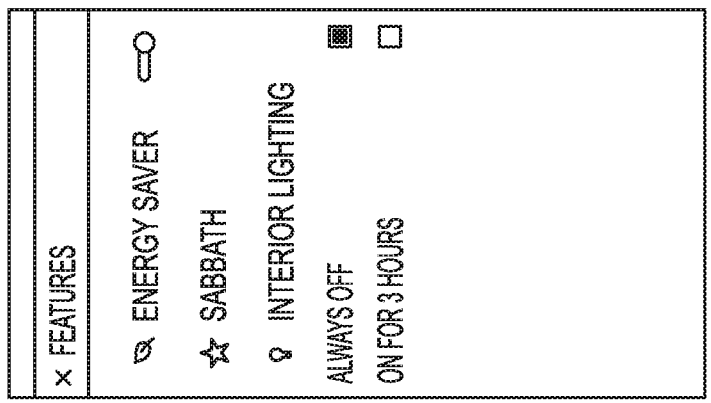
Figure 7E:
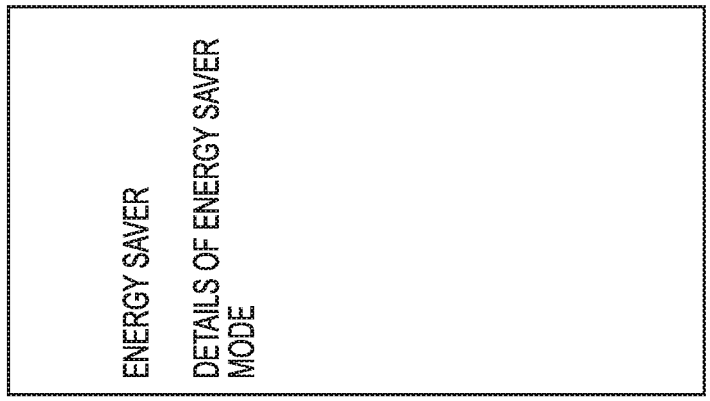
Figure 7D:
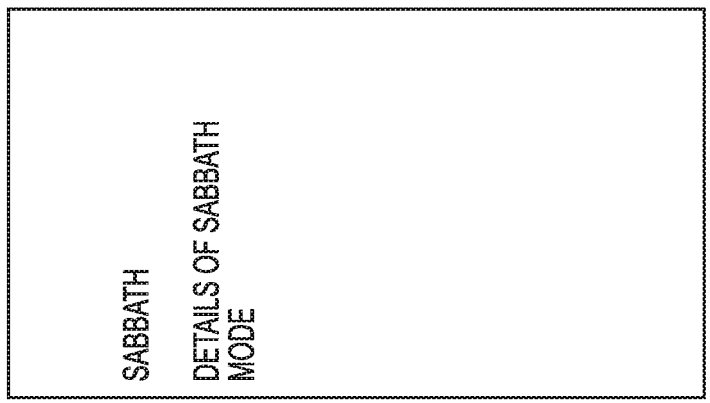
Figure 7C:
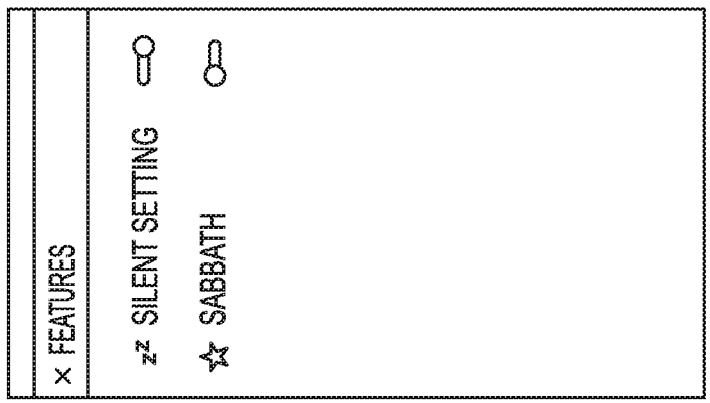

For example, in FIG. 7a, the user can elect whether or not certain modes of operation are used with the unit, such as "Energy Saver" "Sabbath" (the current settings are maintained on the unit without requiring or prompting any human interaction for a period of time (e.g. during the "Sabbath" as followed by religions), and controls and preferences for the control of the interior lighting based upon the operation of the oven. For example, the operation of the interior light of the unit can be controlled, such as "on when door opens," "on for 3 hours," "on for 6 hours," and the like. As depicted in FIG. 7D, for example, if the use clicks on the term "Sabbath" on FIG. 7a, the screen of FIG. 7D will appear to the user that provides an explanation of the operation of the unit 10 in the "Sabbath" mode.

Referring now to FIGS. 8A-8C, an exemplary embodiment is shown of the manner in which the system 20 provides information on the screen 33 of the device 32 relating to the preferences of the user regarding the notifications to be provided to the user device 32 via the system 20.

Figure 9D:
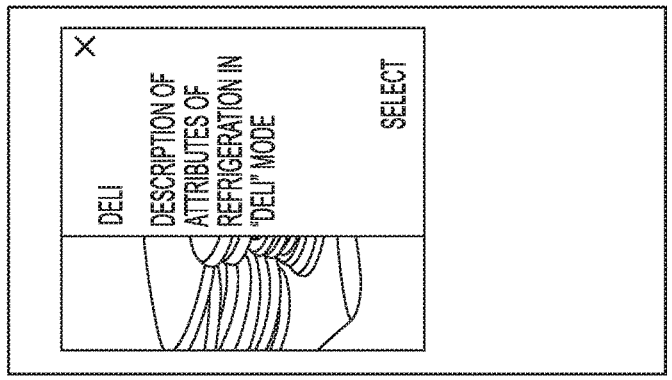
FIGS. 9A-9D are screen shots of a food product selection mode of the application/system according to an exemplary embodiment of the invention.
Figure 9C:
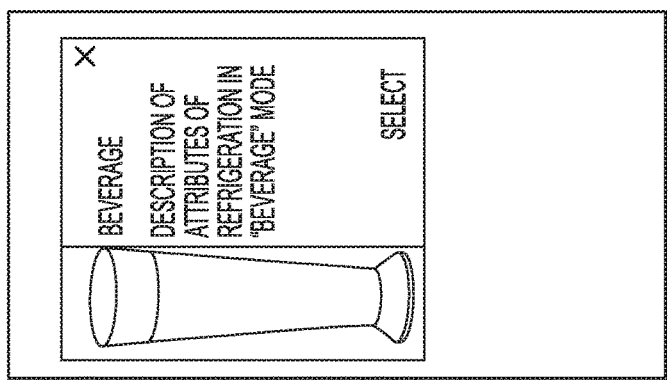
Figure 9B:
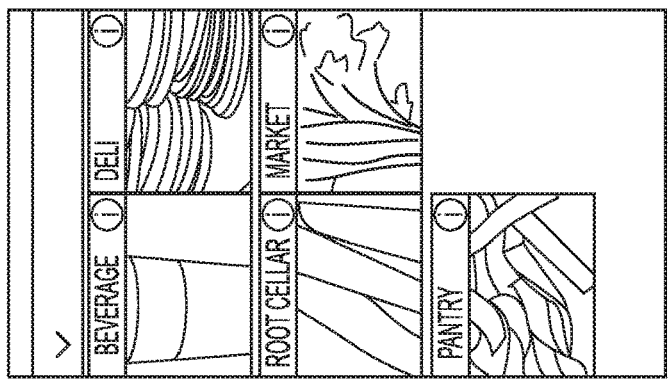
Figure 9A:
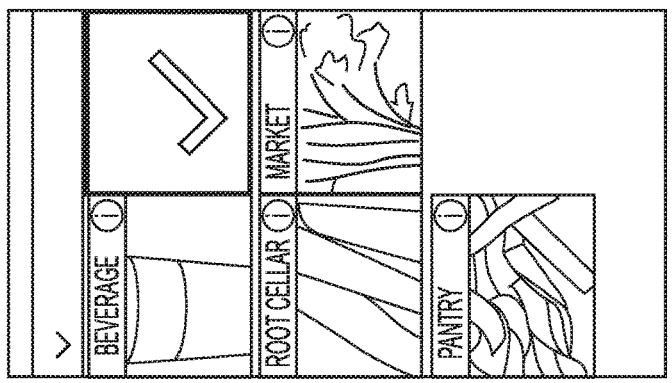
Figure 10A:
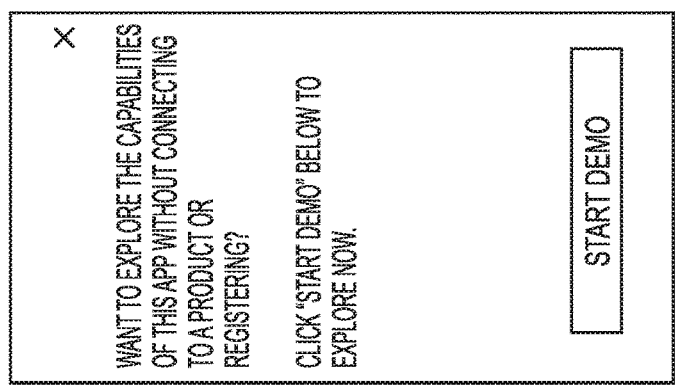
Figure 10B:
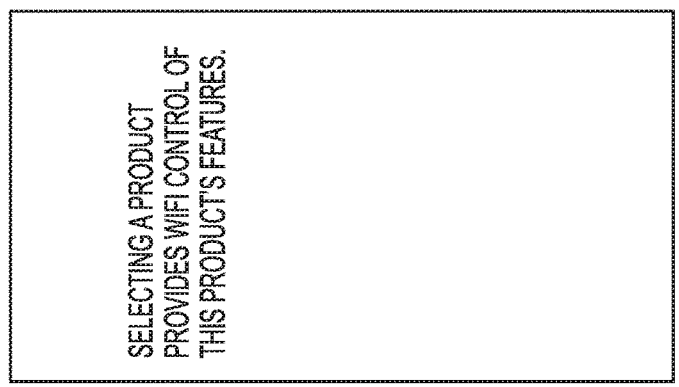
Figure 10C:
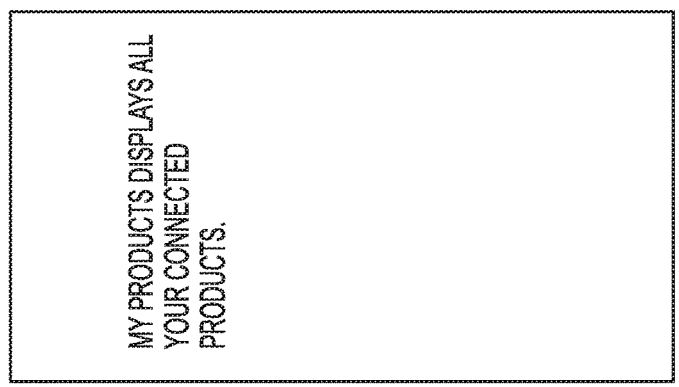
Figure 10D:
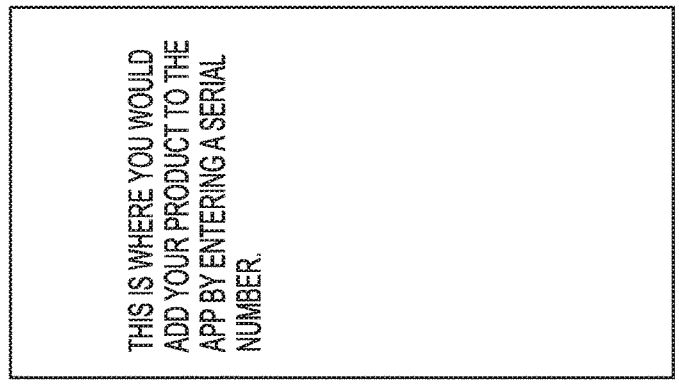

Referring now to FIGS. 9A-9D, an exemplary embodiment is shown of the manner in which the system 20 provides information on the screen 33 of the device 32 relating to a food product selection mode for enabling the system 20 to accurately control the operation of the unit(s) 10 based on the type of food product 14 disposed in one or more compartments 26 of the unit(s) 10. For example, the unit can be controlled in various modes suitable to store various types of foods and beverages, such as "Beverage," "Deli," "Root Cellar" (vegetables), "Market," Pantry, or the like. The application may provide the user with a pictorial representation of the mode as well as the written words (FIGS. 9A, 9B). When one of the modes is selected (e.g. FIG. 9C, Beverage) the application may display a description of the attributes of control under that mode, as well as a pictorial representation.

Referring now to FIGS. 10A-10D, an exemplary embodiment is shown of the manner in which the system 20 provides information on the screen 33 of the device 32 relating to a demonstration of the operation of the system 20 in monitoring and controlling the operation of the unit(s) 10.

Figure 11D:
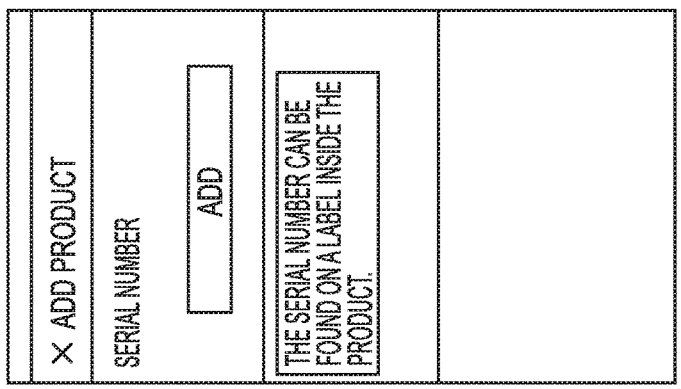
FIGS. 11A-11D are screen shots of a product addition mode of the application/system according to an exemplary embodiment of the invention.
Figure 11C:
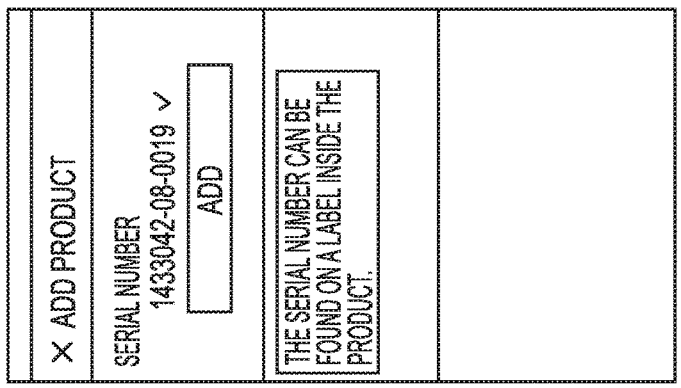
Figure 11B:
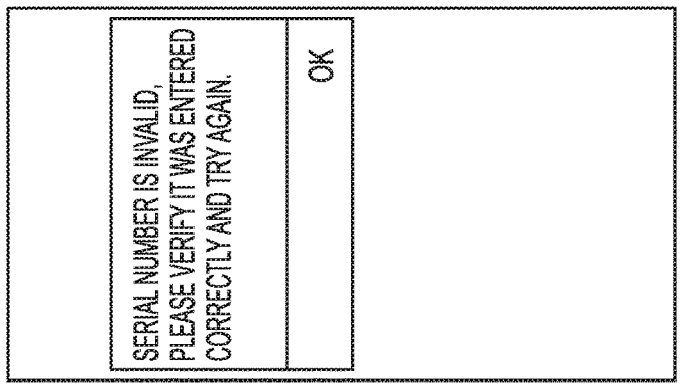
Figure 11A:
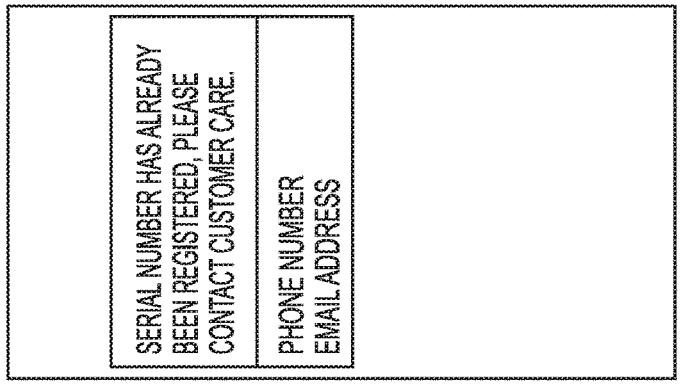
Figure 12C:
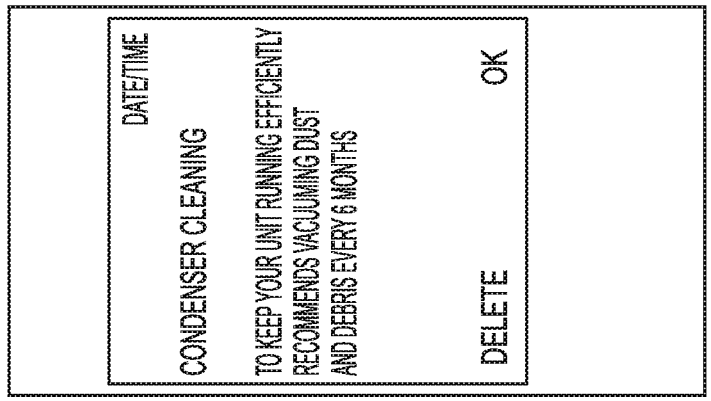
FIGS. 12A-12I are screen shots of a maintenance notification mode of the application/system according to an exemplary embodiment of the invention.
Figure 12B:
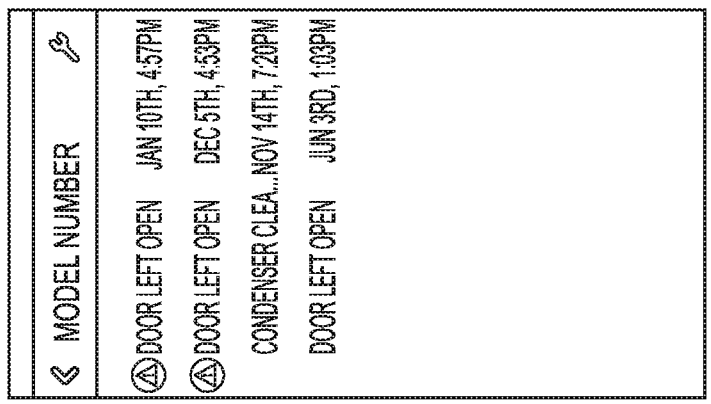
Figure 12A:
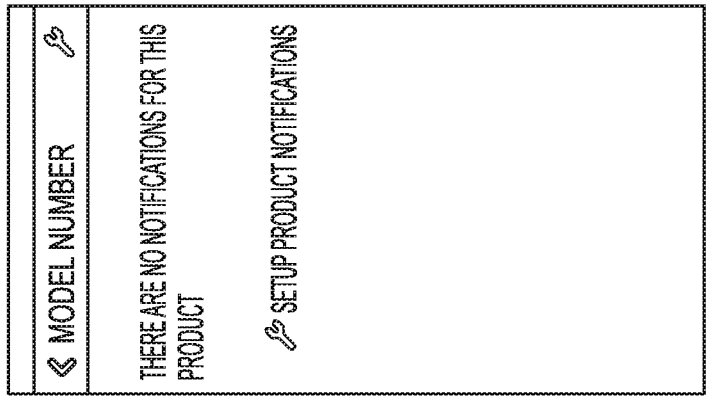
Figure 12F:
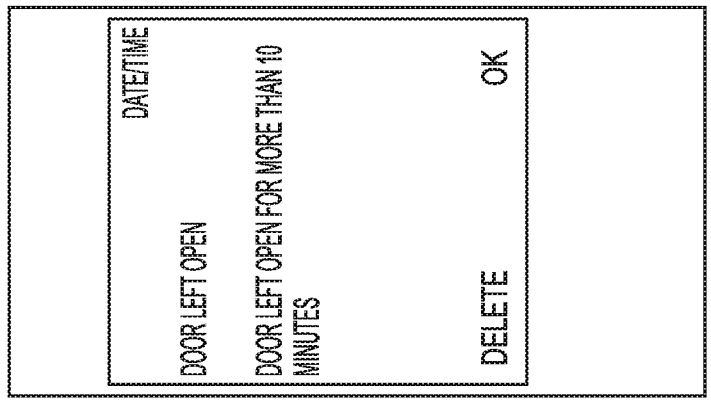
Figure 12E:
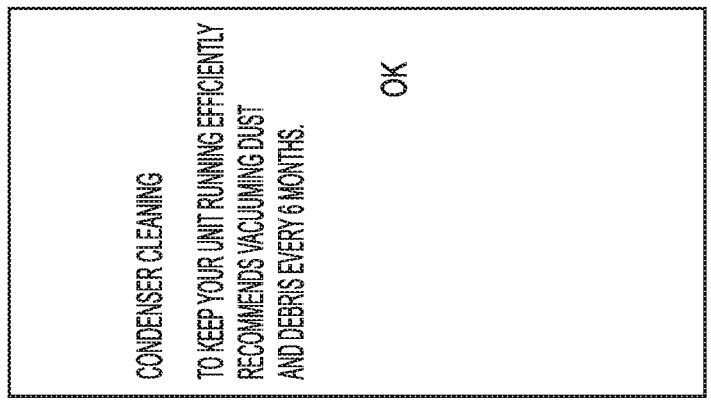
Figure 12D:
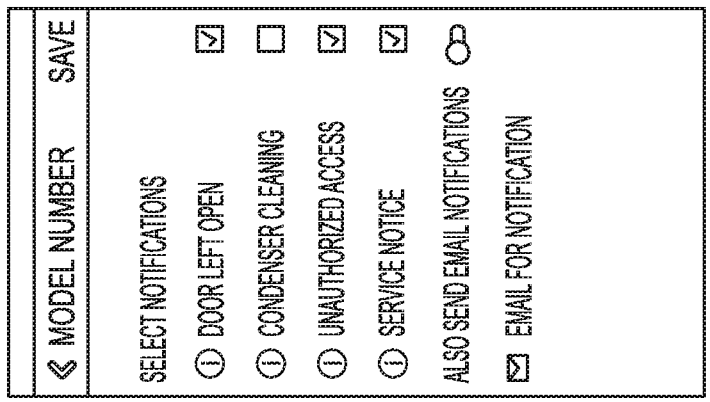
Figure 12I:
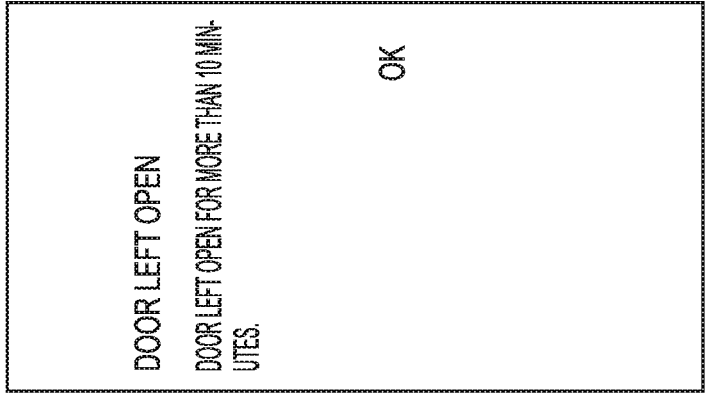
Figure 12H:
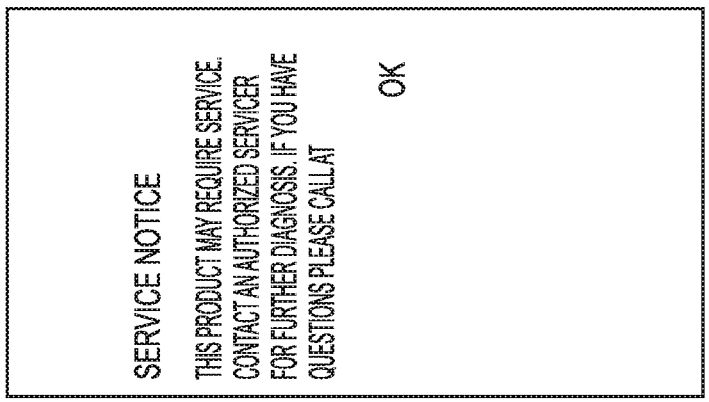
Figure 12G:
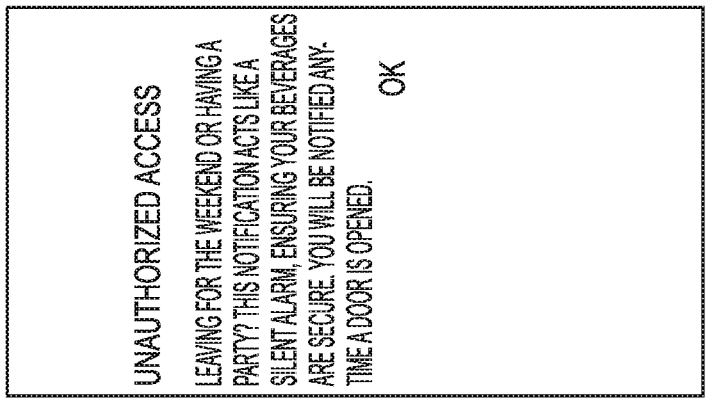

Referring now to FIGS. 11A-11D, an exemplary embodiment is shown of the manner in which the system 20 provides information on the screen 33 of the device 32 relating to prompts and instructions for the user for the addition of unit(s) 10 to the system 20 for enabling monitoring and control of the unit(s) 10 by the system 20. For example, as depicted in FIGS. 11A and 11B, the user may be prompted to add a serial number or other identification number of the unit. The application may be capable of communicating with the servers of the manufacturer to assess in real time whether the serial number entered is a serial number for a unit that was manufactured by the manufacturer and provide real time feedback if the serial number is not valid (FIG. 11C) or has already been entered into another application (on a different device (FIG. 11D).

Referring now to FIGS. 12A-12I, an exemplary embodiment is shown of the manner in which the system 20 provides information on the screen 33 of the device 32 relating to notifications sent via the transceiver 30 to the device 32 regarding the operation of the unit(s) 10, including notification on the maintenance of the unit(s) 10, the operating status of the unit(s) 10, such as a log of the when the closure 16 has been opened and closed to access the unit(s) 10, various maintenance notifications for the unit(s) 10, unauthorized access notifications and notifications concerning operational issues with the unit(s) 10 that require service to be called, among others.

In certain embodiments, a system for monitoring, controlling and providing feedback on the operation of a refrigeration unit is provided. The system comprises: (a) a transceiver adapted to be connected to a central processing unit (CPU) of the refrigeration unit; and (b) a user device operably connected to the transceiver for receiving and transmitting signals between the transceiver and the device.

In another embodiment, a method of monitoring, controlling and providing feedback on the operation of a refrigeration unit comprises the steps of: (a) providing the system discussed directly above; (b) connecting the transceiver to the CPU; and (c) transmitting signals between the transceiver and the device.

In other embodiments, an appliance comprises: a wireless transceiver configured to communicate wirelessly with a user device; and a processor coupled to the wireless transceiver. The processor is configured to: transmit a status signal via the wireless transceiver to the user device, the status signal including a current measured operating parameter of the appliance; receive an instruction signal via the wireless transceiver from the user device, the instruction signal including an instruction to change an operating parameter of the appliance. The processor may be further configured to transmit the current measured operating parameter of the appliance comprising a current measured operating temperature of the appliance. The wireless transceiver may be configured to communicate wirelessly with a user device via a Wi-Fi connection. The processor may be further configured to receive the instruction signal including an instruction to change a set temperature of the appliance. The processor may be further configured to receive the instruction signal including an instruction to change a mode of the appliance, the mode including at least one of a beverage mode, a wine mode, a Sabbath mode, or an energy saver mode. In certain embodiments, the appliance is a refrigeration appliance, however other appliance types are possible, including microwaves, ice makers, freezers, stoves, oven ranges, and other known appliances.

In certain embodiments, the processor of the appliance is further configured to transmit an abnormal condition notification signal via the wireless transceiver to the user device, the abnormal condition notification signal comprising at least one of an indication that a door of the appliance has been open for a period of time exceeding a predetermined time threshold or an indication that the appliance requires service. The processor may be further configured to receive the instruction signal including an instruction to activate an email notification mode; activate an email notification mode; and transmit an email notification initiation message to a server to send an email notification including an indication that a door of the appliance has been open for a period of time exceeding a predetermined time threshold or an indication that the appliance requires service. In other embodiments, the processor is further configured to receive the instruction signal including an instruction to activate a door open notification mode; activate the door open notification mode; and transmit a door open notification signal via the wireless transceiver to the user device whenever the door is opened in response to activating the door open notification mode.

In some embodiments, a user device includes a display device, a wireless transceiver configured to communicate with an appliance via a network, and a processor coupled to the display device. The processor may be configured to: receive a status signal via the wireless transceiver from the appliance, the status signal including a first current measured operating parameter of the appliance; transmit an instruction signal via the wireless transceiver to the appliance, the instruction signal including an instruction to change a set operating parameter of the appliance; and provide, via the display device, a user interface to display the current measured operating parameter of the appliance and to enable altering of the set operating parameter of the appliance.

In certain embodiments, the processor of the user device is further configured to transmit the instruction signal including an instruction to change a set temperature of the appliance. The processor may be further configured to: provide, via the display device, the user interface to display the first current measured operating parameter of the refrigeration appliance comprising a first measured temperature of a first zone of the refrigeration appliance and a second current measured operating parameter of the refrigeration appliance comprising a second measured temperature of a second zone of the refrigeration appliance; provide the display of the first current measured operating parameter and the second current measured operating parameter in a side-by-side configuration when the refrigeration appliance includes the first zone to the side of the second zone; and provide the display of the first current measured operating parameter above the second current measured operating parameter when the refrigeration appliance includes the first zone on top of the second zone.

In other embodiments, the processor of the user device is further configured to: receive, via the user interface, a selection of a mode of the appliance, the mode including at least one of a beverage mode, a wine mode, a Sabbath mode, or an energy saver mode; and transmit the instruction signal including an instruction to change the mode of the appliance to the selected mode. The processor may be further configured to: receive an abnormal condition notification signal via the wireless transceiver from the appliance, the abnormal condition notification signal comprising at least one of an indication that a door of the appliance has been open for a period of time exceeding a predetermined time threshold or an indication that the appliance requires service; and display, via the display device, a notification corresponding to the abnormal condition notification signal in response to receiving the abnormal condition notification signal.

In still other embodiments, the processor of the user device is further configured to: receive, via the user interface, an activation of a door open notification mode; receive a door open notification signal via the wireless transceiver from the appliance whenever the door is opened; and display, via the display device, a notification corresponding to the door open notification signal in response to receiving the door open notification signal. The processor may be further configured to: receive, via the user interface, a creation of a location corresponding to a physical location; and receive, via the user interface, an assignment of the location as an assigned location for the appliance.

In other embodiments, a method for controlling an appliance includes: measuring a current operating temperature of the appliance; transmitting, by a transceiver of an appliance, a status signal including the current operating temperature of the appliance; receiving, by a user device communicatively coupled to the appliance, the status signal; displaying, by the user device, a graphical indication of the current operating temperature of the appliance; receiving, by a user interface of the user device, an alteration of an operating parameter of the appliance; transmitting, by the user device to the appliance, an instruction signal including the alteration of the operating parameter of the appliance; receiving, by the transceiver of the appliance, the instruction signal; and altering, by the appliance, the operating parameter according to the instruction signal.

The method may further include: receiving, by the user interface of the user device, an alteration of a set operating temperature of the appliance; transmitting, by the user device to the appliance, the instruction signal including the alteration of the set operating temperature of the appliance; altering, by the appliance, the set operating temperature according to the instruction signal. The method can also include: receiving, via the user interface of the user device, an activation of a door open notification mode; receiving, by the user device from the appliance, a door open notification signal whenever the door is opened; and displaying, on the display device, a notification corresponding to the door open notification signal in response to receiving the door open notification signal. In other embodiments, the method further includes: receiving, via the user interface of the user device, an activation of an email notification mode; and receiving, at the user device, an email notification including an indication that a door of the appliance has been open for a period of time exceeding a predetermined time threshold or an indication that the appliance requires service.

Various other embodiments of the invention are contemplated as being within the scope of the filed claims particularly pointing out and distinctly claiming the subject matter regarded as the invention.

The invention claimed is:

1. An appliance comprising:
   a wireless transceiver configured to communicate wirelessly with a user device wherein the user device includes a display device and a user device processor that is configured to:
   provide, via the display device, a user interface to display a first current measured operating parameter of the appliance comprising a first measured temperature of a first zone of the appliance and a second current measured operating parameter of the appliance comprising a second measured temperature of a second zone of the appliance;

provide the display of the first current measured operating parameter and the second current measured operating parameter in a side-by-side configuration when the appliance includes the first zone to the side of the second zone; and provide the display of the first current measured operating parameter above the second current measured operating parameter when the appliance includes the first zone on top of the second zone; and an appliance processor coupled to the wireless transceiver, the processor configured to transmit, via the wireless transceiver to the user device, the first current measured operating parameter of the appliance and the second current measured operating parameter of the appliance.

2. The appliance of claim 1 wherein the appliance processor is further configured to transmit the current measured operating parameter of the appliance comprising a current measured operating temperature of the appliance.

3. The appliance of claim 1 wherein the wireless transceiver is configured to communicate wirelessly with the user device via a Wi-Fi connection.

4. The appliance of claim 1, wherein the appliance is a refrigeration appliance.

5. The appliance of claim 1 wherein the appliance processor is further configured to transmit an abnormal condition notification signal via the wireless transceiver to the user device, the abnormal condition notification signal comprising at least one of an indication that a door of the appliance has been open for a period of time exceeding a predetermined time threshold or an indication that the appliance requires service.

6. The appliance of claim 5 wherein the appliance processor is further configured to:

receive an instruction signal, via the wireless transceiver from the user device, the instruction signal including an instruction to activate an email notification mode;

activate an email notification mode; and transmit an email notification initiation message to a server to send an email notification including an indication that a door of the appliance has been open for a period of time exceeding a predetermined time threshold or an indication that the appliance requires service.

7. The appliance of claim 1 wherein the appliance processor is further configured to:

receive an instruction signal, via the wireless transceiver from the user device, the instruction signal including an instruction to activate a door open notification mode;

activate the door open notification mode; and transmit a door open notification signal via the wireless transceiver to the user device whenever the door is opened in response to activating the door open notification mode.

8. The appliance of claim 1 wherein the appliance processor is further configured to receive an instruction signal via the wireless transceiver from the user device, the instruction signal including an instruction to change an operating parameter of the appliance.

9. The appliance of claim 8 wherein the appliance processor is further configured to receive the instruction signal including an instruction to change a set temperature of the appliance.

10. The appliance of claim 8 wherein the appliance processor is further configured to receive the instruction signal including an instruction to change a mode of the appliance, the mode including at least one of a beverage mode, a wine mode, a Sabbath mode, or an energy saver mode.

11. A user device comprising:

a display device;

a wireless transceiver configured to communicate with an appliance via a network; and a processor coupled to the display device, the processor configured to:

receive, via the wireless transceiver from the appliance, a first current measured operating parameter of the appliance comprising a first measured temperature of a first zone of the appliance and a second current measured operating parameter of the appliance comprising a second measured temperature of a second zone of the appliance;

transmit an instruction signal via the wireless transceiver to the appliance, the instruction signal including an instruction to change a set operating parameter of the appliance;

provide, via the display device, a user interface to display the first current measured operating parameter of the appliance and the second current measured operating parameter of the appliance and to enable altering of the set operating parameter of the appliance;

provide the display of the first current measured operating parameter and the second current measured operating parameter in a side-by-side configuration when the appliance includes the first zone to the side of the second zone; and provide the display of the first current measured operating parameter above the second current measured operating parameter when the appliance includes the first zone on top of the second zone.

12. The user device of claim 11 wherein the processor is further configured to transmit the instruction signal including an instruction to change a set temperature of the appliance.

13. The user device of claim 11 wherein the processor is further configured to:

receive, via the user interface, a selection of a mode of the appliance, the mode including at least one of a beverage mode, a wine mode, a Sabbath mode, or an energy saver mode; and transmit the instruction signal including an instruction to change the mode of the appliance to the selected mode.

14. The user device of claim 11 wherein the processor is further configured to:

receive an abnormal condition notification signal via the wireless transceiver from the appliance, the abnormal condition notification signal comprising at least one of an indication that a door of the appliance has been open for a period of time exceeding a predetermined time threshold or an indication that the appliance requires service; and display, via the display device, a notification corresponding to the abnormal condition notification signal in response to receiving the abnormal condition notification signal.

15. The user device of claim 11 wherein the processor is further configured to:

receive, via the user interface, an activation of a door open notification mode;

receive a door open notification signal via the wireless transceiver from the appliance whenever the door is opened; and display, via the display device, a notification corresponding to the door open notification signal in response to receiving the door open notification signal.

16. The user device of claim 11 wherein the processor is further configured to:

receive, via the user interface, a creation of a location corresponding to a physical location; and receive, via the user interface, an assignment of the location as an assigned location for the appliance.

17. A method for controlling an appliance, the method comprising:

measuring a first current operating temperature of a first zone of the appliance and a second current operating temperature of a second zone of the appliance;

transmitting, by a transceiver of the appliance, a status signal including the current operating temperature of the appliance;

receiving, by a user device communicatively coupled to the appliance, the status signal;

displaying, by the user device, a graphical indication of the first current operating temperature and the second current operating temperature wherein the displaying further comprises:

displaying the first current operating temperature and the second current operating temperature in a side-by-side configuration when the appliance includes the first zone to the side of the second zone; and displaying the first current operating temperature above the second current operating temperature when the appliance includes the first zone on top of the second zone;

receiving, by a user interface of the user device, an alteration of an operating parameter of the appliance;

transmitting, by the user device to the appliance, an instruction signal including the alteration of the operating parameter of the appliance;

receiving, by the transceiver of the appliance, the instruction signal; and altering, by the appliance, the operating parameter according to the instruction signal.

18. The method of claim 17 further comprising:

receiving, by the user interface of the user device, an alteration of a set operating temperature of the appliance;

transmitting, by the user device to the appliance, the instruction signal including the alteration of the set operating temperature of the appliance; and altering, by the appliance, the set operating temperature according to the instruction signal.

19. The method of claim 17 further comprising:

receiving, via the user interface of the user device, an activation of a door open notification mode;

receiving, by the user device from the appliance, a door open notification signal whenever the door is opened; and displaying, on the display device, a notification corresponding to the door open notification signal in response to receiving the door open notification signal.

20. The method of claim 17 further comprising:

receiving, via the user interface of the user device, an activation of an email notification mode; and receiving, at the user device, an email notification including an indication that a door of the appliance has been open for a period of time exceeding a predetermined time threshold or an indication that the appliance requires service.

* * * * *